(12) United States Patent
Wilbur

(10) Patent No.: US 9,585,039 B2
(45) Date of Patent: Feb. 28, 2017

(54) SOFTWARE APPLICATIONS FOR DISPLAYING AND OR RECORDING RECEIVER SIGNAL STRENGTHS AND OTHER PARAMETERS

(71) Applicant: John Russell Wilbur, San Jose, CA (US)

(72) Inventor: John Russell Wilbur, San Jose, CA (US)

( * ) Notice: Subject to any disclaimer, the term of this patent is extended or adjusted under 35 U.S.C. 154(b) by 0 days.

(21) Appl. No.: 14/273,472

(22) Filed: May 8, 2014

(65) Prior Publication Data

US 2014/0335795 A1  Nov. 13, 2014

Related U.S. Application Data

(60) Provisional application No. 61/822,223, filed on May 10, 2013.

(51) Int. Cl.
*H04W 24/08* (2009.01)
*H04M 1/725* (2006.01)
*H04W 4/02* (2009.01)

(52) U.S. Cl.
CPC ....... *H04W 24/08* (2013.01); *H04M 1/72572* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 7,522,917 B1* | 4/2009 | Purdy, Jr. | ............... | H04W 24/00 455/422.1 |
| 8,917,158 B2* | 12/2014 | Bong | ..................... | G06F 3/016 340/5.53 |
| 9,077,812 B2* | 7/2015 | Hansen | ............. | H04M 1/72547 |
| 2003/0100317 A1* | 5/2003 | Kaplan | ................ | G08G 1/0104 455/436 |
| 2005/0033515 A1* | 2/2005 | Bozzone | .............. | G01C 22/006 701/472 |
| 2005/0282540 A1* | 12/2005 | Motamedi | ............. | H04W 16/18 455/423 |
| 2006/0128311 A1* | 6/2006 | Tesfai | ................... | G01S 5/0252 455/67.11 |
| 2006/0135180 A1* | 6/2006 | Jakel | ..................... | H04W 48/16 455/456.5 |
| 2008/0102809 A1* | 5/2008 | Beyer | .................... | G01C 21/00 455/420 |
| 2009/0164115 A1* | 6/2009 | Kosakowski | ...... | G01C 21/3641 701/533 |

(Continued)

*Primary Examiner* — Kenny Lin

(57) ABSTRACT

A software application installed on a mobile device periodically measures a parameter and records it along with the position associated with the measurement. These data are recorded on the device's internal memory and displayed in the form of a map so that users can navigate to locations with desired parameter levels. In one embodiment, this parameter may be cellular signal strength, allowing users in areas with no useable cellular signal to find a location where a phone call can be placed. Parameter and location data may be displayed in a map as they are acquired or in other embodiments they may be preloaded onto the device, for example allowing cellular signal strength maps to be displayed on a device even when it has no current data connection.

6 Claims, 5 Drawing Sheets

(56) References Cited

U.S. PATENT DOCUMENTS

| | | | |
|---|---|---|---|
| 2009/0201149 A1* | 8/2009 | Kaji | G01C 21/20 340/539.13 |
| 2011/0039573 A1* | 2/2011 | Hardie | G01C 21/005 455/456.1 |
| 2011/0217964 A1* | 9/2011 | Matsuo | H04W 4/02 455/414.2 |
| 2011/0294515 A1* | 12/2011 | Chen | G01S 5/0252 455/456.1 |
| 2011/0306323 A1* | 12/2011 | Do | G01C 21/20 455/414.1 |
| 2012/0309376 A1* | 12/2012 | Huang | H04M 1/72572 455/418 |
| 2013/0317944 A1* | 11/2013 | Huang | G01S 5/0252 705/26.61 |
| 2014/0067257 A1* | 3/2014 | Dave | G01C 21/3461 701/423 |
| 2014/0357302 A1* | 12/2014 | Wilbur | H04W 4/025 455/456.3 |
| 2014/0371887 A1* | 12/2014 | Hoffman | G06K 9/00342 700/91 |

* cited by examiner

Software Applications for Displaying and Recording Receiver Signal Strengths and Other Parameters Software Applications for Displaying and Recording Receiver Signal Strengths and Other Parameters Software Applications for Displaying and
Recording Receiver Signal Strengths and
Other Parameters Software Applications for Displaying and
Recording Receiver Signal Strengths and
Other Parameters Software Applications for Displaying and
Recording Receiver Signal Strengths and
Other Parameters

SOFTWARE APPLICATIONS FOR DISPLAYING AND OR RECORDING RECEIVER SIGNAL STRENGTHS AND OTHER PARAMETERS

CROSS-REFERENCE TO RELATED APPLICATIONS

The present application claims priority to a Provisional Patent Application 61/822,223, filed on May 10, 2013. All disclosure of the prior application is incorporated herein at least by reference.

BACKGROUND OF THE INVENTION

1. Field of the Invention

The present invention generally relates to the technical field of wireless communication devices and, in particular, to techniques for measuring, recording, and displaying signal strengths and other parameters as a function of location.

2. Description of Related Art

It is well known in the art that cellular wireless systems rely on base stations that cover a limited geographic area, and that a cellular telephone needs to be within the reach of a base station to be able to place, receive or conduct a call. Coverage in any cellular system is not universal, and cell phones are well-known to have an ability to display signal strength.

In some circumstances signal strength may be a life-or-death matter. There are many instances where a person or persons have gotten lost in an area with poor or no cellular coverage, and has died as a result of not being able to call for help.

There exist databases of cellular signal strength as a function of location, but these data are unavailable when a user needs them the most, that is, when the user is already in a location with no useable cellular signal.

When a cellular phone user has poor or no cellular coverage, there is no way for said user to know where a useable cellular signal might be found. For example, thousands of people die every year while lost in the wilderness, but if they were able to place phone calls for help they could be rescued. Many of those people are within walking distance of a useable cellular signal but have no way of knowing whether it exists or where to find it.

A solution to this technical problem that would allow users in a no-coverage location to find a useable cellular signal would thus be of great value. Several advantages of one or more aspects are to provide a map of cellular signal strength data as a function of location that is available to a mobile device user even when said device is unable to access the internet. These and other advantages of one or more aspects will become apparent from a consideration of the ensuing description and accompanying drawings.

BRIEF SUMMARY OF THE INVENTION

In accordance with one embodiment, a software application installed on a mobile device records a cellular signal strength and an associated latitude and longitude at predefined intervals of time or distance. The signal strength and corresponding location coordinates may be recorded on the mobile device and also may be transmitted to other devices or repository databases. The signal strength and corresponding location coordinates may be displayed to a user in the form of a map to allow navigation to a useable cellular signal. The signal strength and corresponding location coordinates from one or more devices or users may be transmitted from said devices or from repository databases to a single device, providing the user of said device with a map of signal strength as a function of location even in an area the user has never before visited. The user may download signal strength and corresponding location coordinates from one or more devices before entering an area with poor signal strength. The software application may download signal strength and corresponding location coordinates through an automated process without prompting by the user. In addition to cellular signal strength, other parameters measured by the mobile device may be measured, recorded, and displayed using the same method.

DETAILED DESCRIPTION OF THE INVENTION

Figure 1:
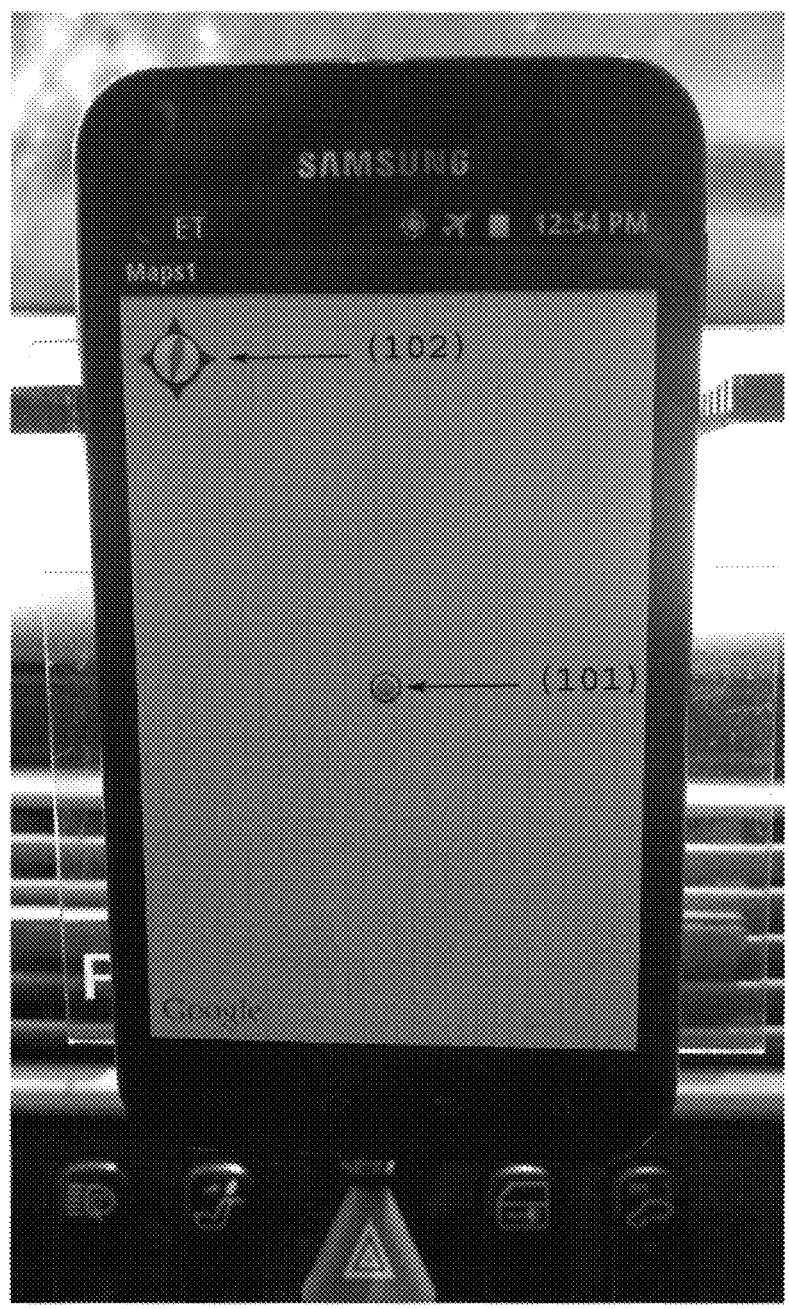
FIG. 1 is a view of a software application for measuring, recording, and displaying signal strength data as a function of location in one embodiment of the present invention.

FIG. 1 is an illustration of a software application for measuring, recording, and displaying signal strength data as a function of location according to an embodiment of the present invention. In this embodiment there is a blue icon 101 indicating the current position of a device running the software application as determined by GPS. In this embodiment a compass 102 in FIG. 1 shows the orientation of the device, which can aid a user in navigating from the current location to another location on the map.

Figure 2:
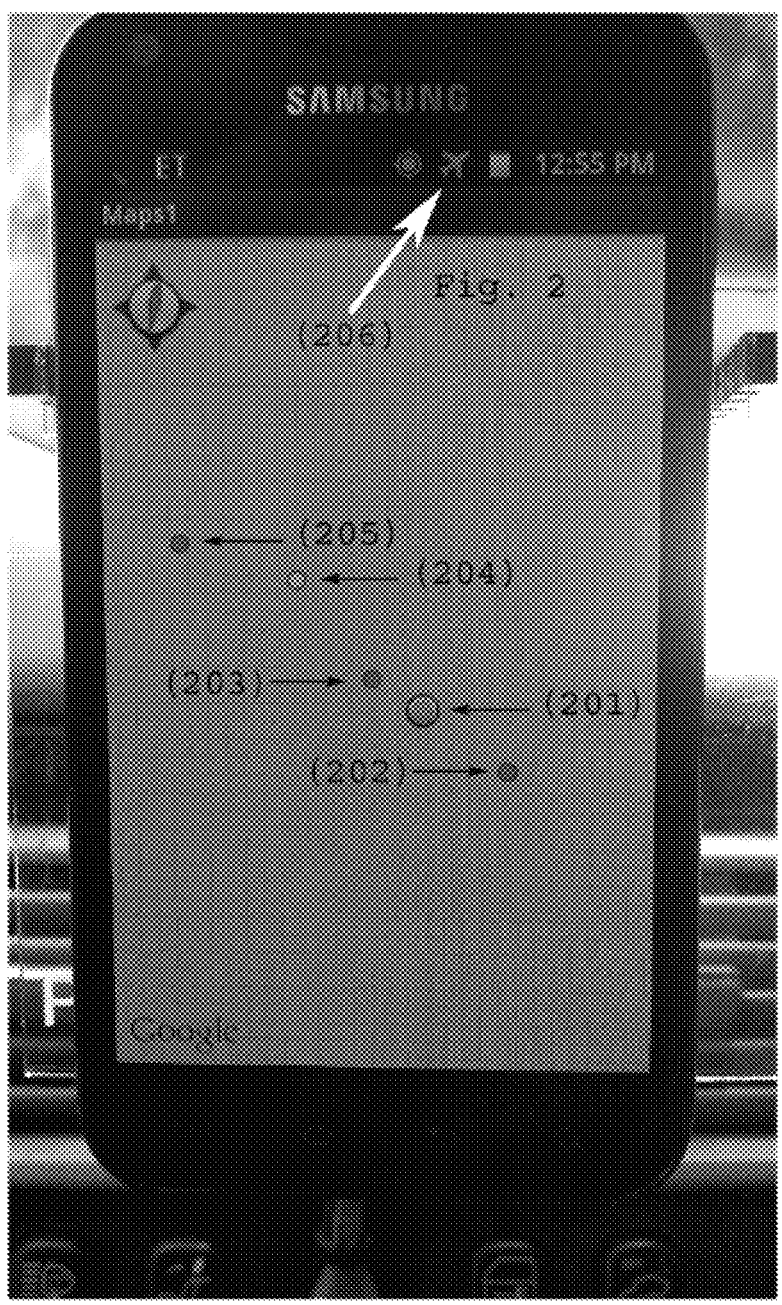
FIG. 2 is a view of the software application of FIG. 1 in which methods for displaying signal strength as a function of location are shown.

FIG. 2 is an illustration of a software application for measuring, recording, and displaying signal strength data as a function of location according to an embodiment of the present invention. In this embodiment there is a blue icon 201 indicating the current position of a device running the software application as determined by GPS, serving the same function as the blue icon 101 in FIG. 1. In this embodiment there are 4 additional icons, 202, 203, 204, and 205, arranged to form a map based on the positions at which signal strength and location data were recorded. Each of these icons communicates the signal strength at its location by the design of the icon. In this embodiment, red circular icons 202, 203, and 205 indicate a signal strength that was very low or undetectable. A green circular icon 204 indicates a strong signal strength, showing the user that a phone call can be made from this location. Icon design can communicate a range of values, for instance by using a yellow circular dot to indicate a marginally useable cellular signal or by varying icon shape to indicate the age of the data or the type of device that acquired it. Icon 206 shows that the mobile device is in "airplane mode" during this operation, demonstrating that the software application can be used when the mobile device has no cellular data connection.

The user may use the map shown in FIG. 2 in this embodiment to navigate from current location icon 201 to useable cellular signal location 204 in order to make a call.

The signal strength data displayed through icon design in FIG. 2 in this embodiment can either be recorded by the same device on which it is displayed, or it may be recorded by another device or set of devices and then downloaded onto the displaying device. If a user were to run the software application after arriving in an area with no cellular service and if the software application had not previously downloaded signal strength and location data for that area, the software would periodically measure signal strength and location data and record it to the device's internal memory. Said data would then be displayed in the form of a map similar to that shown in FIG. 2. If the software application downloaded signal strength and location data from a repository database or another device before the user entered the area with no cellular service, that data would be displayed on the map in addition to the signal strength and location data collected by the user. In either case, once the device regains a data connection the software would optionally upload the signal strength and location data to a repository database so that other users would be able to access it and, if necessary, preload it before entering an area with no cellular service.

Figure 2A:
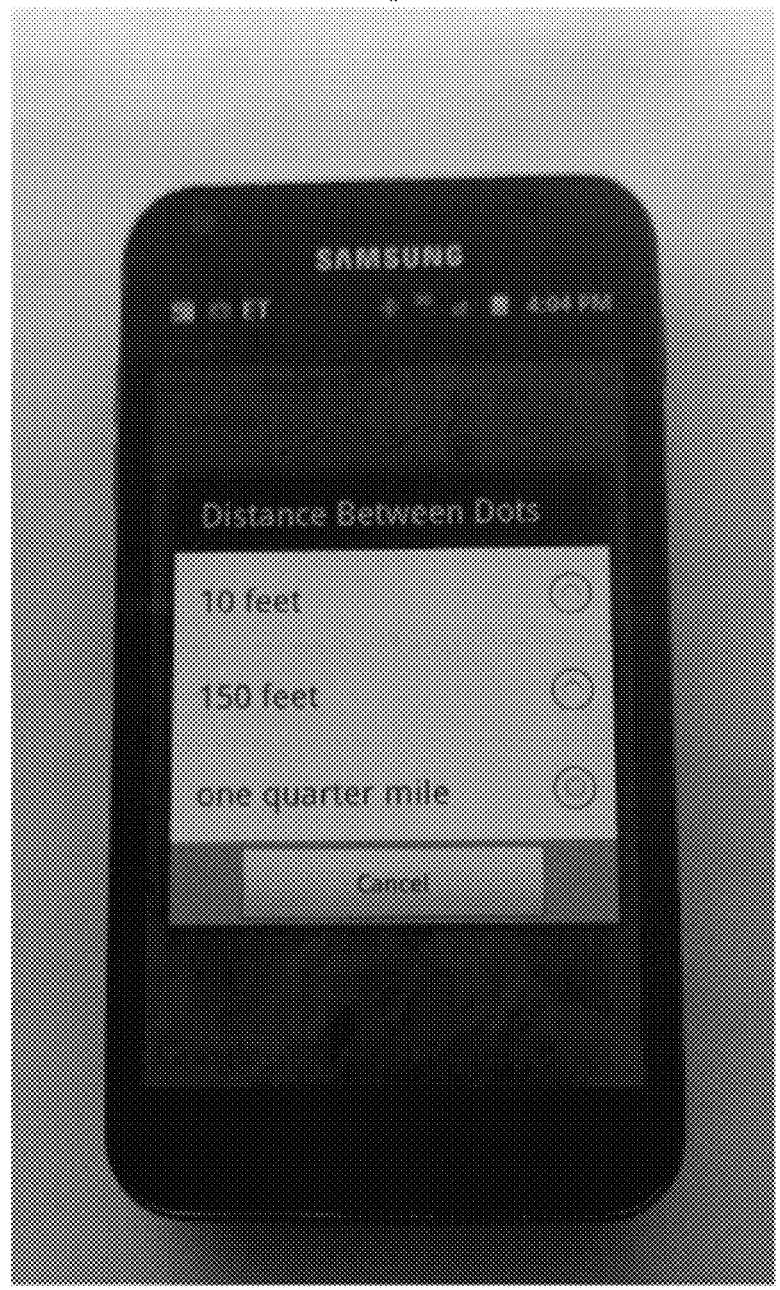
FIG. 2A is a view of an option menu allowing the user to adjust spacing between data points in the software application of FIG. 1.

FIG. 2A is an illustration an option menu in which a user can adjust spacing between data points in this embodiment. In this embodiment, the user can choose between 3 predefined distances. When a user selects one of these distances and a mobile device's GPS location data indicates that the device has traveled as far as the selected distance, the software application measures signal strength and location data and records it to the phone's internal memory. In other embodiments, the interval between data measurements is based on elapsed time or other parameters.

Figure 3:
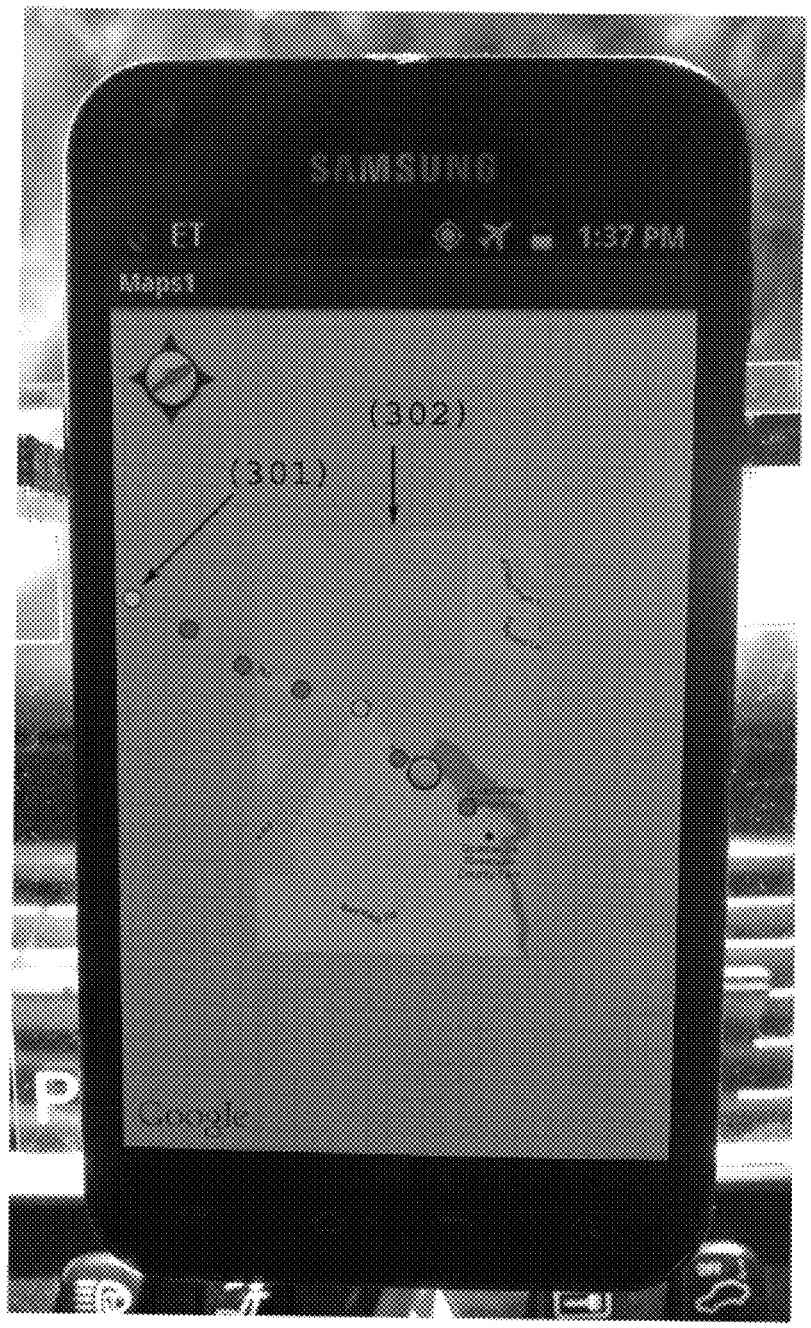
FIG. 3 is a view of the software application of FIG. 1, in which signal strength data as a function of location are superimposed on a corresponding roadmap image that has partially downloaded to the phone.

FIG. 3 is an illustration of a software application for measuring, recording, and displaying signal strength data as a function of location according to an embodiment of the present invention. In this embodiment the signal strength data as a function of location are superimposed on a corresponding roadmap image that has partially downloaded to the phone. The overlay display improves a user's ease of navigation between current location, indicated by the blue icon, and the location of a useable cellular signal 301. This illustration demonstrates partial loading of the roadmap layer in the form of roadmap tile 302 being displayed behind the signal strength icon layer. The software application is always able to display the signal strength icon layer and loads as much of other useful layers as possible depending on the user's preference and the availability of a data connection.

Figure 4:
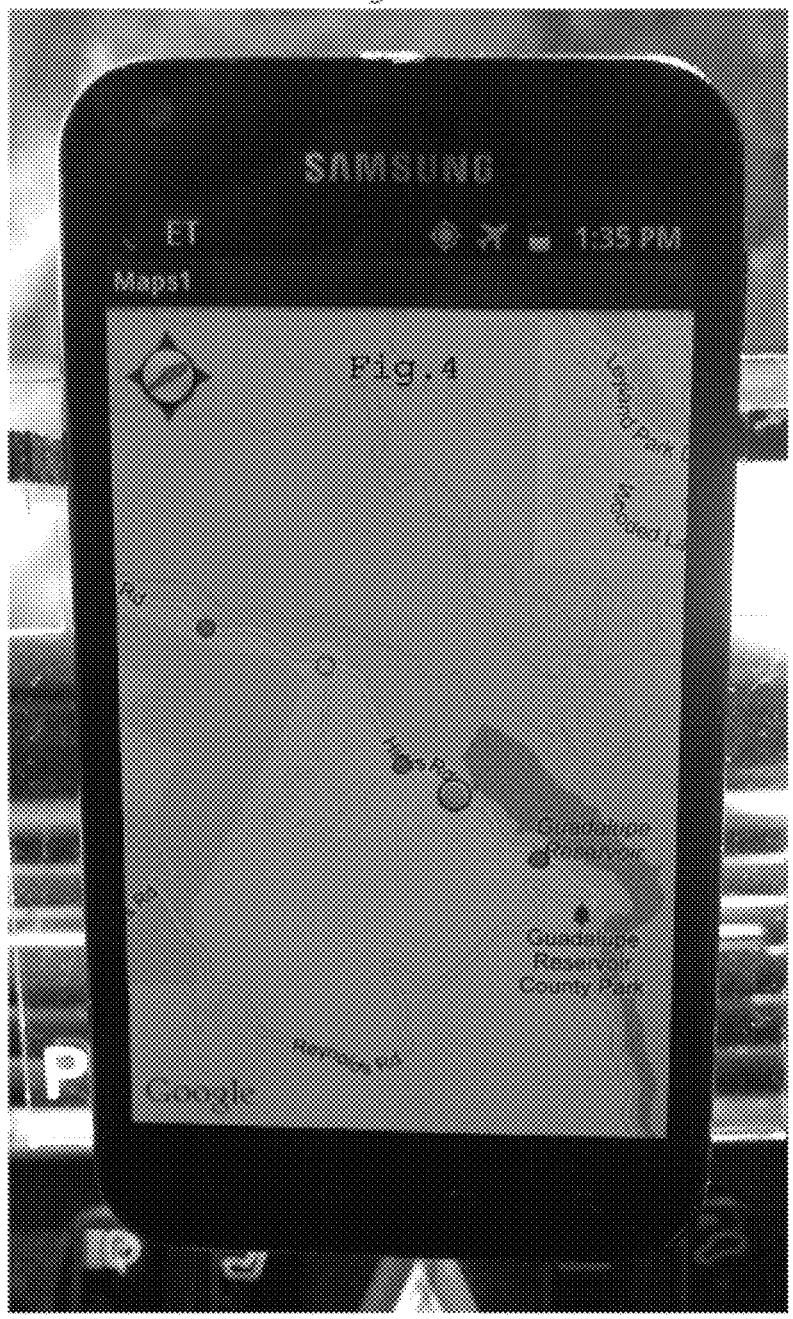
FIG. 4 is a view of the software application of FIG. 1, in which signal strength data as a function of location are superimposed on a corresponding roadmap image that has completely downloaded to the phone.

FIG. 4 is an illustration of the software application embodiment of FIG. 4 in which the roadmap layer has completely downloaded, allowing for the display of a complete roadmap layer behind the signal strength icon layer.

The recorded signal strength data can be transmitted from the mobile device's internal memory to a repository database, for example one connected to the internet. Data stored in the repository database can be collected from large numbers of devices and large numbers of users. The data stored in the repository can be accessed through several methods, for example it can be downloaded by the software application in FIG. 1, or it can be accessed through a website interface.

The data to be downloaded onto a mobile device or viewed on a website can be filtered by criteria either set by users or by the software application. For example, a user could choose to download only signal strength and location data collected in specific areas, by specific phone models, or pertaining to specific cellular service providers. The software application may filter based on those criteria as chosen by the user or based on an automated prediction of which areas, phone models, and cellular service providers would be of interest to the user.

In one embodiment, the software may measure the direction of travel of the device, detect that the device's path will take it into an area with no useable cellular signal, and then download mobile signal strength and location data around that area while the device still has a functional data connection.

Although the present disclosure refers expressly to the "GPS" or "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

It will be apparent to a skilled artisan that the embodiments described above are exemplary of inventions that may have greater scope than any of the singular descriptions. There may be many alterations made in these examples without departing from the spirit and scope of the invention. For example, the embodiments described above describe cellular signal strength as the primary layer, but any parameter measureable by the mobile device could be measured, recorded, and displayed using this method. For example, a device could measure, record, and display temperature, chemical concentration, radioactivity, or landmine locations using this method. These and many other features may change in different embodiments.

The invention claimed is:

1. A method for utilizing cellular signal strengths as a function of location for path navigation and guiding a user of a mobile device to reach a destination with sufficient cellular signal strength for establishing communication, comprising:
   a) Measuring, by the mobile device, one or more cellular signal strengths at selected predetermined distance or predetermined time interval throughout a path traveled by the user; wherein each of the measured one or more cellular signal strengths is determined with a strength level of strong, low or undetectable;
   b) Determining, by a Global Positioning System (GPS) of the mobile device, sequential location points at said selected predetermined distance or predetermined time interval throughout said path traveled; wherein the GPS utilize communication signals other than cellular signals;
   c) Associating, by the mobile device, said GPS determined sequential location points with the measured one or more cellular signal strengths;
   d) Storing, by the mobile device, the measured one or more cellular signal strengths and said GPS determined sequential location points to the mobile device's internal memory;

e) Retrieving said stored one or more cellular signal strengths and said stored GPS determined sequential location points from said internal memory;
f) Displaying, by the mobile device, a map with said GPS determined sequential location points as icons representing the strength level of each of the stored one or more cellular signal strength; wherein different icons are utilized for representing the strength level of strong, low or undetectable;
g) Tracking in real time, by the GPS of the mobile device, the mobile device's current location; and
h) Display in real time, by the mobile device, the tracked current location on the map in respective to the displayed icons; thereby enabling the user to navigate along the displayed icons.

2. The method according to claim 1, wherein the predetermined distance is one of 10feet, 150 feet, or one quarter mile.

3. The method according to 1, wherein the icons representing the strength level utilize different colors or shapes for representing the strength level of strong, low or undetectable.

4. A method for utilizing cellular signal strengths as a function of location for path navigation and guiding users of mobile devices to reach a destination with sufficient cellular signal strength for establishing communication, comprising:
  a) Measuring, by a first mobile device, one or more cellular signal strengths at selected predetermined distance or predetermined time interval throughout a path traveled by a user of the first mobile device; wherein each of the measured one or more cellular signal strengths is determined with a strength level of strong, low or undetectable;
  b) Determining, by a Global Positioning System (GPS) of the first mobile device, sequential location points at said selected predetermined distance or predetermined time interval throughout said path traveled; wherein the GPS utilize communication signals other than cellular signals;
  c) Associating, by the first mobile device, said GPS determined sequential location points with the measured one or more cellular signal strengths;
  d) Storing, by the first mobile device, the measured one or more cellular signal strengths and said GPS determined sequential location points to a remote storage device;
  e) Retrieving, by another mobile device, said stored one or more cellular signal strengths and said stored GPS determined sequential location points from said remote storage memory;
  f) Displaying, by said another mobile device, a map with said GPS determined sequential location points as icons representing the strength level of each of the stored one or more cellular signal strength; wherein different icons are utilized for representing the strength level of strong, low or undetectable;
  g) Tracking in real time, by a GPS of said another mobile device, said another mobile device's current location; and
  h) Display in real time, by said another mobile device, the tracked current location on the map in respective to the displayed icons; thereby enabling a user of said another mobile device to navigate along the displayed icons.

5. The method according to claim 4, wherein the predetermined distance is one of 10feet, 150 feet, or one quarter mile.

6. The method according to claim 4, wherein the icons representing the strength level utilize different colors or shapes for representing the strength level of strong, low or undetectable.

* * * * *